Patented Aug. 15, 1933

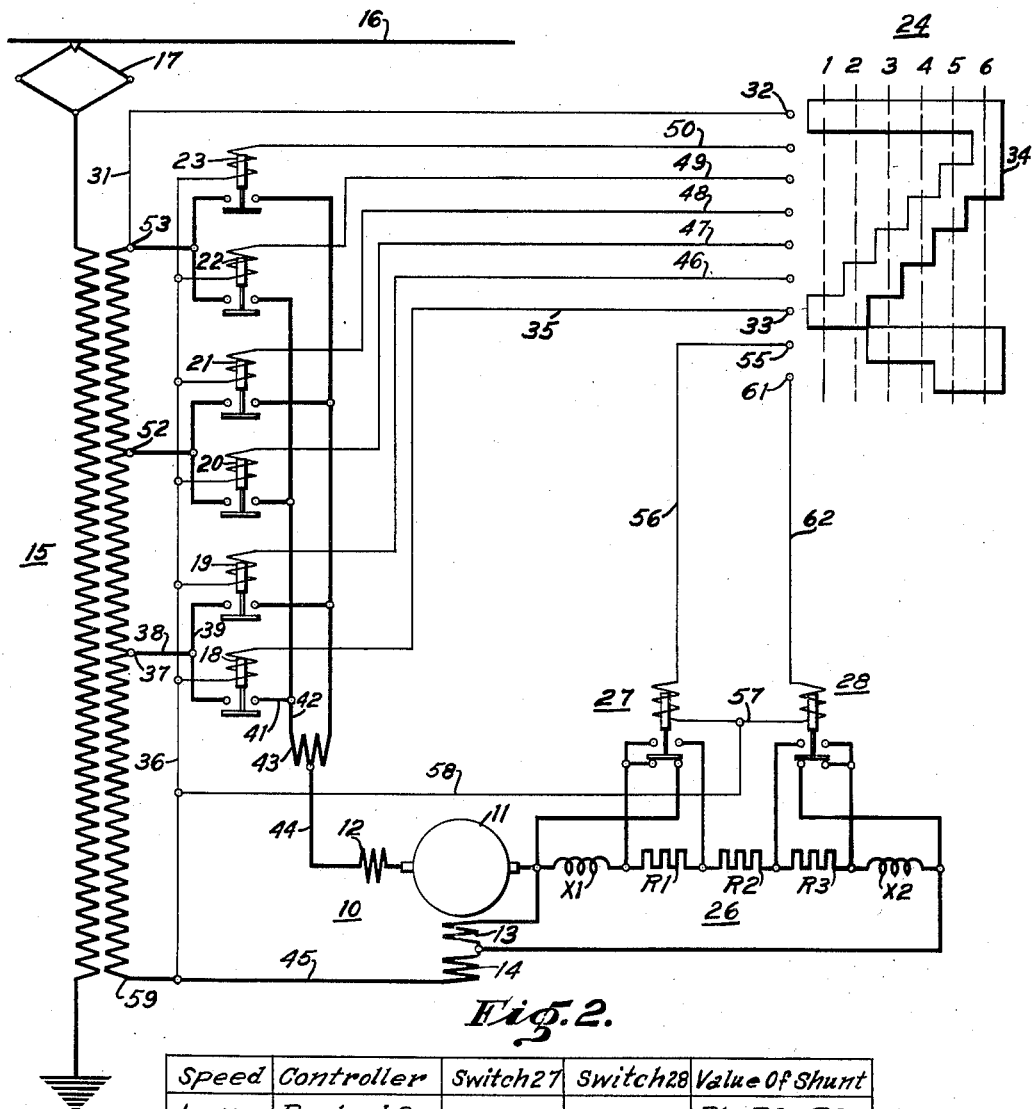

1,922,724

UNITED STATES PATENT OFFICE 1,922,724

MOTOR CONTROL SYSTEM

Stuart H. Cowin, Pittsburgh, and Lloyd J. Hibbard, Wilkinsburg, Pa., assignors to Westinghouse Electric and Manufacturing Company, a Corporation of Pennsylvania Application September 15, 1931
Serial No. 562,878

8 Claims. (Cl. 171—228)

Our invention relates, in general, to motor control systems and more particularly to systems for controlling the operation of alternating-current motors of the commutator type.

In order to prevent sparking of motors of the commutator type, it is necessary to provide interpole windings to overcome the sparking voltage that is produced in the coil of the armature winding undergoing commutation. If a motor is designed to operate at a constant speed, an interpole winding may be provided which will produce a field of the proper strength to give good commutation at the normal speed of the motor. However, when a motor is required to operate at variable speeds, as is a railway motor, it is necessary to provide for varying the strength of the interpole field, as the speed of the motor is varied, in order to secure good commutation at the various speeds at which the motor is required to operate.

The strength of the interpole field may be varied by shunting a portion of the interpole current through an interpole shunt, composed of resistance and reactance and connected in parallel-circuit relation to the interpole winding of the motor. The amount of current permitted to flow through the interpole winding may be controlled by varying the resistance and reactance of the interpole shunt. However, care must be taken to avoid the possibility of an open circuit in the interpole shunt during transition from one setting to another, as the motor will flash over at its commutator if the circuit through the interpole shunt is opened while the motor is operating.

An object of our invention, therefore, is to provide for varying the relative values of resistance and reactance of an interpole shunt, as the speed of a motor is varied, in order to control both the amount and the phase position of the current in the interpole winding.

A further object of our invention is to provide a switching system for controlling the resistance and reactance of a shunt winding which shall be simple and efficient in operation and which precludes the possibility of a switch failure causing an open circuit in the shunt winding.

Other objects of our invention will be described fully hereinafter or will be apparent to those skilled in the art.

According to our invention the strength of the interpole field of a commutator motor may be varied by changing the relative values of resistance and reactance of an interpole shunt which is connected in parallel-circuit relation to the interpole field winding, thereby varying the amount and the phase position of the current permitted to flow in the interpole winding. A plurality of switches, which may be controlled by the master controller or by a speed relay, are disposed to shunt predetermined portions of the resistance and reactance of the interpole shunt as the speed of the motor is varied. The switches are so connected to the interpole shunt that the failure of a switch to operate properly cannot result in an open circuit in the interpole winding, thereby preventing the commutator of the motor from flashing.

For a fuller understanding of the nature and scope of our invention, reference may be had to the following detailed description, taken in conjunction with the accompanying drawing, in which:

Figure 1 is a diagrammatic view of a motor control system embodying our invention, and Fig. 2 is a chart showing the relative values of resistance and reactance of the interpole shunt for various speeds of the motor.

Referring to the drawing, the reference character 10 designates, generally, a motor which may be of a type suitable for propelling an electric vehicle. In the embodiment of our invention which is illustrated, the motor 10 is an alternating-current motor of the single-phase commutator type, having an armature winding 11, a main field winding 12, an interpole winding 13 and a compensating field winding 14. An interpole shunt 26 is provided for the winding 13 and is controlled by switches 27 and 28, as hereinafter more fully set forth. Although our invention is particularly adapted for use with motors of the type illustrated, it is not limited to motors of this type and may be readily utilized in connection with any motor of the commutator type which is required to operate at variable speeds.

Power for operating the motor 10 is supplied from a transformer 15 which is energized from a trolley conductor 16 through a current collecting device 17, which may be of the pantograph type.

In accordance with usual practice in railway applications utilizing alternating-current power, the motor 10 may be accelerated by increasing the voltage applied to the motor by means of a plurality of accelerating switches 18 to 23, inclusive, which are disposed to so connect the motor 10 to the transformer 15 that the voltage applied to the motor may be successively increased, in order to accelerate the motor.

The operation of the accelerating switches is controlled by a controller 24, which may be of the well-known drum type comprising a plurality of contact fingers which are disposed to engage contact segments as the controller drum is rotated.

In order to simplify the drawing and description, the number of accelerating switches shown is limited to that required for establishing three different connections to the transformer 15. It will be understood that additional connections may be readily provided for by increasing the number of accelerating switches, thereby increasing the number of steps in the speed range of the motor 10.

As previously explained, it is necessary to provide a motor of the commutator type with an interpole winding in order to prevent sparking at the commutator during the operation of the motor. As also explained, it is necessary to provide a means for varying the strength of the magnetic field produced by the interpole winding, as the speed of the motor is varied, in order to prevent sparking at the various speeds and thereby secure good commutation over the entire speed range within which the motor is required to operate.

In accordance with our invention, the strength of the interpole field may be varied by means of the combined resistance and reactance interpole shunt 26, which is connected in parallel-circuit relation to the interpole winding 13. It will be understood that the amount and the phase position of the current permitted to flow in the interpole winding 13 may be regulated by varying the relative values of resistance and reactance of the shunt 26, thereby increasing or decreasing the amount of current flowing in the interpole winding 13.

As shown, the interpole shunt 26 comprises reactors X1 and X2 and resistors R1, R2 and R3, which may be connected in series-circuit relation, as illustrated in the drawing. It will be understood that the number of steps of resistance and reactance may be readily increased, if desired.

In order that the relative values of the resistance and reactance of the interpole shunt 26 may be varied, the switches 27 and 28, which have contact members disposed to shunt predetermined portions of the resistance and reactance comprising the interpole shunt 26, are provided. The switches 27 and 28 are illustrated as being electrically operated. However, they may be actuated by any other suitable means, such as air pressure.

The operation of the switches 27 and 28 is controlled by contact segments provided on the drum of the controller 24. In this manner, the switches 27 and 28 may be operated in sequential relation, as the motor 10 is accelerated by means of the accelerating switches 18 to 23, inclusive.

If desired, the switches 27 and 28 may be controlled by a relay that is responsive to the speed of the motor. The relay may be one of the well-known mechanical types of speed relays or of an electrical type, such as is shown and described in the patent to Hellmund No. 1,224,166.

The functioning of the apparatus may be explained by describing the operation of the control system. Assuming that it is desired to connect the motor 10 to the power source to accelerate the motor, the controller 24 may be actuated to position "1", thereby energizing the actuating coil of the switch 18. The circuit for the actuating coil of the switch 18 may be traced from one terminal 53 of the secondary winding of the transformer 15, through conductor 31, contact fingers 32 and 33—bridged by the contact segment 34 of the controller 24—conductor 35, the actuating coil of the switch 18 and conductor 36 to the other terminal 59 of the secondary winding of the transformer 15.

When the switch 18 is closed, an energizing circuit for the motor 10 is established, which extends from the tap connection 37 of the transformer 15, through conductors 38 and 39, the contact members of the switch 18, conductors 41 and 42, a portion of preventive coil 43, of a familiar type, conductor 44, field winding 12, armature winding 11, interpole winding 13, and compensating field winding 14 of the motor 10 and conductor 45 to transformer 15.

The preventive coil 43 may be either a resistance or an inductance and it is introduced into the motor circuit in order to prevent short circuiting a portion of the transformer winding when passing from one transformer tap to the next to accelerate the motor.

The motor 10 may be accelerated to any desired speed, in a manner well known in the art, by advancing the controller 24 to energize the actuating coils of the switches 19, 20, 21, 22 and 23, in sequential relation, through the conductors 46, 47, 48, 49 and 50, respectively. It will be understood that, as the switches 19 to 23 are closed in sequential relation thereby connecting the motor 10 to the taps 52 and 53 of the transformer 15, the voltage applied to the motor is gradually increased, thereby causing the motor to accelerate in speed. Hence, a detailed description of this operation is not deemed necessary, particularly since our invention is not directed thereto.

As previously explained, the interpole shunt 26 is so connected in parallel-circuit relation to the interpole winding 13 that a portion of the motor current flows through the shunt 26, irrespective of whether switches 27 and 28 are in their upper or their lower positions. While the controller 24 is on positions "1" and "2", which permit the motor 10 to operate at a low speed, the actuating coils of the switches 27 and 28 are deenergized, thereby permitting the switches to remain in their lower position. As shown, when the switches 27 and 28 are in their lower position, the reactor X1 is shunted by the movable contact member of the switch 27 and the reactor X2 is shunted by the movable contact member of the switch 28. Therefore, when the motor 10 is operating at a low speed, the interpole shunt 26 comprises the resistors R1, R2 and R3 only. It has been our experience that the best commutating characteristics are obtained, when a motor of the type shown is operating at a low speed, by providing an interpole shunt comprising resistance only. However, it will be understood that if better results may be obtained with motors of other types by including reactance in the interpole shunt, as well as resistance, when the motor is operating at a relatively low speed, this result may be readily accomplished by so connecting the contact members of the interpole shunting switches as to shunt only a portion of the reactors X1 and X2.

When the controller 24 is actuated to position "3", which causes the motor 10 to be accelerated to a medium speed, the actuating coil of the switch 27 is energized through a circuit which extends from the contact finger 55, which is engaged by the energized contact segment 34, conductor 56, the actuating coil of the switch 27 and conductors 57, 58 and 36 to the terminal 59 of the transformer 15.

When the actuating coil of the switch 27 is energized the movable contact is raised to its upper position, thereby interrupting the shunt circuit around the reactor X1 and establishing a shunt circuit for the resistor R1. While the controller 24 is on positions "3" and "4" and the motor 10 is operating at a medium speed, the interpole shunt 26 will, therefore, comprise the reactor X1 and the resistors R2 and R3, as indicated in Fig. 2. It will be seen that, by actuating the switch 27, the resistance of the shunt 26 has been decreased and its reactance increased, thereby permitting the relative value and phase angle of current permitted to flow in the shunt 26 and the interpole winding 13 to change as the speed of the motor is varied, which, as previously explained, has been found to greatly improve the commutation of a motor of the type shown.

If the motor is accelerated to a still higher speed by actuating the controller 24 to position "5", a circuit is established for the actuating coil of the switch 28. This circuit extends from the contact finger 61, which engages the contact segment 34, conductor 62, the actuating coil of the switch 28 and conductors 57, 58 and 36 to the terminal 59 of the transformer 15.

When the actuating coil of the switch 28 is energized, the movable contact is raised to its uppermost position, which interrupts the shunt circuit around the reactor X2 and establishes a parallel circuit around the resistor R3, thereby shunting the resistor R3 from the interpole shunt 26 and inserting the reactor X2 in the shunt 26. Therefore, when the motor 10 is operating at a high speed, the interpole shunt 26 comprises the reactor X1, the resistor R2 and the reactor X2. Again, it will be observed that, as the speed of the motor 10 is increased, the value of the reactance of the shunt 26, relative to the resistance, has been increased. As previously explained, it has been found that the best commutating conditions are obtained by increasing the reactance of the interpole shunt relative to the resistance as the speed of the motor is increased, thereby controlling both the amount and the phase position of the current in the interpole winding.

It will be observed that the contact members of the switches 27 and 28, are so connected to the shunt 26 as to prevent the occurrence of an open circuit in the shunt 26 during the switching operations which take place during the transition of the motor 10 from one speed to another. As previously explained, it is absolutely necessary that the occurrence of an open circuit in the shunt 26 be prevented while the motor 10 is operating, since opening the interpole circuit will cause the commutator of the motor 10 to flashover, which burns and scores the commutator of the motor, and may cause the entire motor to become ignited.

It will be understood that the control system herein shown and described may be readily expanded to provide for operating the motor over a greater speed range than that illustrated, by increasing the number of steps of resistance and reactance in the shunt 26 and also the number of shunting switches 27 and 28. It will also be understood that it is not necessary to maintain the exact arrangement of resistors and reactors illustrated. The sequence of operation of the switches 27 and 28, and the connections to their contact members may also be changed to provide any desired change in the relative values of reactance and resistance of the shunt 26, as the speed of the motor 10 is varied.

It will be evident from the foregoing description that we have provided a motor control system suitable for controlling the operation of motors of the commutator type that are required to operate at variable speeds, which is simple and reliable in operation, and which ensures good commutation of the motors at all speeds. We have also provided for preventing the possibility of a switch that fails to operate properly during the switching operations causing the commutator of the motor to flashover.

In conclusion, we desire to say that we are not to be restricted to the particular form or arrangement of parts herein shown and described, since it is evident that they may be changed and modified without departing from the spirit and scope of our invention as defined in the appended claims.

We claim as our invention:
1. In a control system for controlling commutator motors, in combination, an interpole winding for the motor, a shunt connected in parallel-circuit relation to the interpole winding, said shunt comprising a plurality of resistors and reactors connected in series-circuit relation, and switching means for increasing the reactance and decreasing the resistance of said shunt as the speed of the motor is increased, said switching means being so disposed as to prevent an open circuit in the shunt during the switching operations.

2. In a control system for controlling commutator motors, in combination, an interpole winding for the motor, a shunt connected in parallel-circuit relation to the interpole winding, said shunt comprising a plurality of resistors and reactors connected in series-circuit relation, and a plurality of switches disposed to be operated in sequential relation to vary the relative values of resistance and reactance of the shunt as the speed of the motor is varied, the contact members of said switches being so connected to the shunt as to prevent an open circuit in the shunt during the switching operations.

3. In a motor control system, in combination, a motor having an interpole winding, a transformer for supplying power to the motor, switching means for varying the voltage applied to the motor to vary the speed thereof, a controller for controlling said switching means, a combined resistance and reactance shunt connected in parallel-circuit relation to the interpole winding, and switching means for varying the relative values of resistance and reactance of the shunt, said switching means being controlled by said controller as the speed of the motor is varied.

4. In a motor control system, in combination, a motor having an interpole winding, a transformer for supplying power to the motor, switching means for varying the voltage applied to the motor to vary the speed thereof, a controller for controlling said switching means, a shunt connected in parallel-circuit relation to the interpole winding, said shunt comprising a plurality of resistors and reactors connected in series circuit relation, and a plurality of switches operatively associated with said controller and disposed to vary the relative value of resistance and reactance of the shunt as the speed of the motor is varied.

5. In a motor control system, in combination, a motor having an interpole winding for improving commutation, a transformer for supplying power to the motor, a plurality of switches for varying the voltage applied to the motor to accelerate it, a controller for controlling the operation of said switches, a combined resistance and reactance shunt for regulating the current in the interpole winding, and switching means controlled by said controller and disposed to vary the relative values of resistance and reactance of said shunt, whereby the amount of current in the interpole winding may be varied as the speed of the motor is varied.

6. In a motor control system, in combination, a motor having an interpole winding for improving commutation, a transformer for supplying power to the motor, a plurality of switches for varying the voltage applied to the motor to accelerate it, a controller for controlling the operation of said switches, a shunt connected in parallel-circuit relation to the interpole winding for regulating the current in the interpole winding, said shunt comprising a plurality of resistors and reactors connected in series-circuit relation, and a plurality of switches disposed to be actuated in sequential relation to increase the reactance and decrease the resistance of said shunt as the motor is accelerated, said switches being controlled by the controller, whereby the amount and the phase position of the current in the interpole winding may be varied as the motor is accelerated.

7. In a motor control system, in combination, a motor having an interpole winding for improving commutation, a transformer for supplying power to the motor, a plurality of switches for varying the voltage applied to the motor to accelerate it, a controller for controlling the operation of said switches, a shunt connected in parallel-circuit relation to the interpole winding for regulating the current therein, said shunt comprising a plurality of resistors and reactors connected in series-circuit relation, and a plurality of switches operatively associated with said controller and disposed to shunt predetermined combinations of said resistors and reactors in sequential relation, whereby the amount and the phase position of the current in the interpole winding may be varied as the motor is accelerated, the contact members of said last-named switches being so connected as to prevent an open circuit in the shunt during the switching operations.

8. In a motor control system, in combination, a motor having an interpole winding, a shunt connected in parallel-circuit relation to the interpole winding, said shunt having both resistance and reactance, switching means for varying the relative values of resistance and reactance of the shunt, control means for controlling the speed of the motor, and means associated with said control means for controlling said switching means.

STUART H. COWIN.
LLOYD J. HIBBARD.